United States Patent [19]
Landl et al.

[11] Patent Number: 5,599,266
[45] Date of Patent: *Feb. 4, 1997

[54] FOAM RESERVOIR FLUID TRANSFER ROLLER

[75] Inventors: Gerald J. Landl, Antioch, Ill.; James R. Carlson, Franksville, Wis.

[73] Assignee: American Roller Company, Union Grove, Wis.

[ * ] Notice: The term of this patent shall not extend beyond the expiration date of Pat. No. 5,415,612.

[21] Appl. No.: 402,574

[22] Filed: Mar. 13, 1995

Related U.S. Application Data

[63] Continuation-in-part of Ser. No. 263,223, Jun. 21, 1994, Pat. No. 5,415,612.

[51] Int. Cl.⁶ .................................................. B23P 15/00
[52] U.S. Cl. .............................. 492/56; 492/53; 492/49; 29/895.32
[58] Field of Search ........................... 492/56, 53, 49, 492/59; 29/895.32; 101/148

[56] References Cited

U.S. PATENT DOCUMENTS

| | | | |
|---|---|---|---|
| 3,705,451 | 12/1972 | Dahlgren . | |
| 3,785,285 | 1/1974 | Chambon | 101/148 |
| 3,835,597 | 9/1974 | Wasil | 51/289 |
| 3,937,141 | 2/1976 | Dahlgren | 101/148 |
| 4,287,827 | 9/1981 | Warner | 101/141 |
| 4,388,864 | 6/1983 | Warner | 101/148 |
| 4,531,386 | 7/1985 | England et al. | 66/202 |
| 4,756,065 | 7/1988 | Calson | 492/56 |
| 4,844,953 | 7/1989 | Kato et al. | 492/56 |
| 4,887,528 | 12/1989 | Ruge et al. | 101/148 |
| 4,981,381 | 1/1991 | Munata | 492/56 |
| 4,991,501 | 2/1991 | Yokoyama et al. | 101/148 |
| 5,257,967 | 11/1993 | Gysin | 492/56 |

*Primary Examiner*—Irene Cuda
*Attorney, Agent, or Firm*—Quarles & Brady

[57] ABSTRACT

A fluid transfer roller for use in offset printing for picking up a film of water and transferring it to a printing plate consists of a rigid core with an outer layer of foamed-in-place, partially open-celled foam.

6 Claims, 1 Drawing Sheet

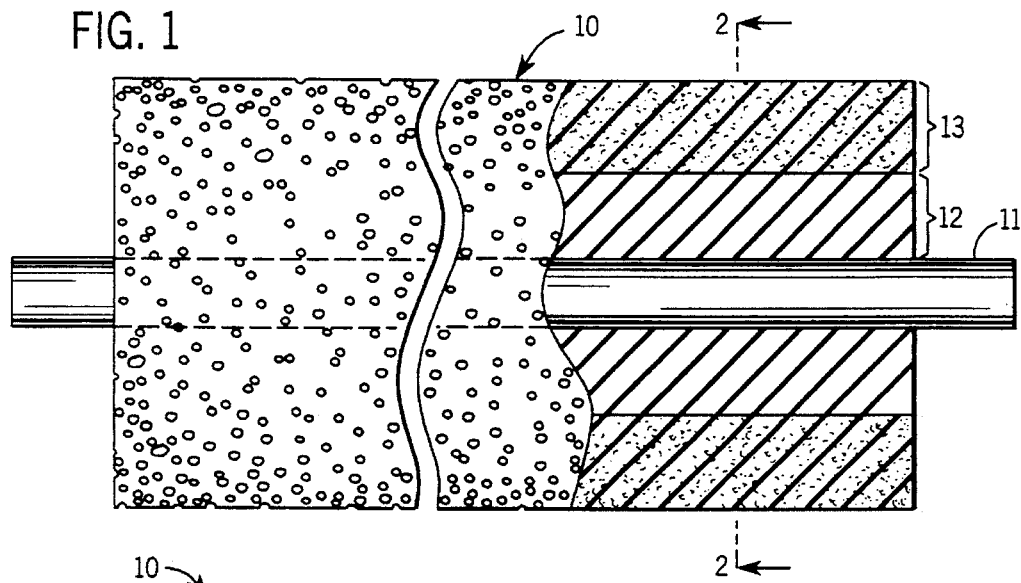
FIG. 1
FIG. 2
FIG. 4
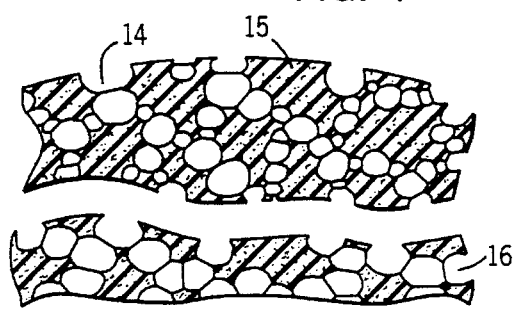
FIG. 3
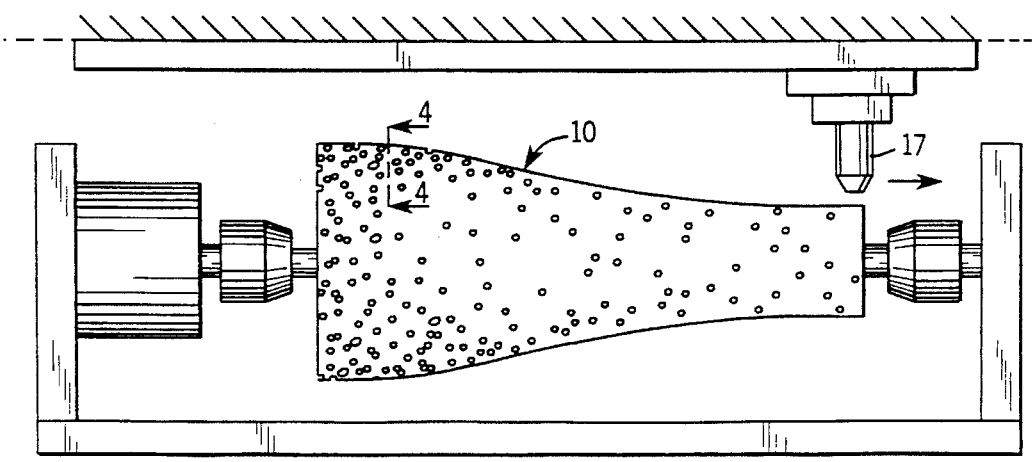

FOAM RESERVOIR FLUID TRANSFER ROLLER

RELATED CASES

This application is a continuation-in-part of our application U.S. Ser. No. 08/263,223 filed Jun. 21, 1994, now U.S. Pat. No. 5,415,612.

FIELD OF THE INVENTION

The present invention relates to a novel roller. More particularly, it relates to a novel fluid transfer roller especially useful in offset printing.

BACKGROUND OF THE INVENTION

Offset printing presses are provided with a dampening system in which a fluid transfer roller transfers water to a plate cylinder.

The amount of water carried by the fluid transfer roller and delivered to the plate cylinder can be critical to the proper operation of the offset printing press. When a fluid transfer roller does not pick up a sufficiently even flat film of water, printing can occur on areas not intended to be printed and there can be a buildup of ink on the rollers which requires that the offset printing press be shut down to permit cleaning. Both printing errors and shutdowns, of course, are costly and time-consuming. Conversely, when too much water is delivered by the fluid transfer roller to the plate cylinder, the ink can be overly diluted on the plate cylinder and the ink may become emulsified. In addition, it also can result in printing on areas which are not intended to be printed. Once again the result is that the efficiency and the performance of the printing system suffers.

One type of fluid transfer roller used in the past in dampening systems was made of steel and had a surface which was either chromium plated or flame sprayed with a metal oxide, such as aluminum oxide, and which was considered hydrophilic. This type of fluid transfer roller did not have a reservoir and because it was relatively heavy it required a large motor for operation. In addition, such steel rollers tended to corrode which could cause an ink buildup on the water rollers.

The most common currently used fluid transfer rollers are elastomeric rollers which are covered with a paper cover or cotton sleeve which creates a fluid reservoir which allows for the proper continual wetting of the non-image areas of the printing plate. The covers and sleeves make the roller surface more hydrophilic. The liquid storage capability of these covers and sleeves provides rollers with a reservoir which allows for the acceptance of excess water when not needed by the printing plate and which supplies more water to the printing plate when the demand is increased. Due to the intermittent needs of the printing plate it is a requirement that these rollers not only act as a reservoir but that they also transfer water to the printing plate when required.

One problem with using a paper cover or cotton sleeve is that to install the cover or sleeve the press has to be shut down, the elastomeric rollers removed from the press, the covers or sleeves positioned over the elastomeric rollers and then the rollers reinstalled back into the press. Because of the considerable down time which occurs, this can be a very costly procedure. In addition, although the sleeves and covers are effective, they are not very durable and they have to be replaced often due to damage, ink contamination and/or wear.

A need exists for a fluid transfer roller which does not possess the disadvantages of the prior art fluid transfer rollers.

SUMMARY OF THE INVENTION

The objects of the present invention are to provide a novel fluid transfer roller for use in an offset printing system that does not possess the disadvantages of the prior art rollers and a method of preparing such a roller.

The novel roller of the present invention comprises a roller with an integral, foamed-in-place, cellular outer layer having a density of about 5 to about 70 pounds per cubic foot (PCF), a compressibility of about 5 to about 100 psi and containing about 10% to about 90% open cells at least some of which are interconnected. The roughly spherical cells of the roller are approximately 0.002 to 0.008 inches in diameter at and near the outer surface and about 0.001 to about 0.004 inches in diameter nearer the core. The open cells near the core are connected to the exposed open cells at the surface by capillary passages so that liquid can flow from the cells near the core to the surface by capillary action. When made by the method of the present invention, the thickness and density of the outer layer can be varied to supply the degree of reservoir desired.

In one embodiment of the invention, there is an intermediate layer of elastomeric or foam material between the cellular outer layer and the rigid core. When foam is used as the intermediate layer it may be desirable to include a barrier seal or layer to prevent the intermediate layer from acting as a fluid reservoir.

In another embodiment of the invention, the cellular outer layer is foamed-in-place on a rigid core.

The roller of the present invention provides several advantages over prior art rollers. The open cells of the outer layer of the cover act as capillaries which allow water or an aqueous fountain solution to be distributed evenly across the surface of plate cylinder. In addition, the open cells below the surface of the layer provide a reservoir for the water or fountain solution and also make it less likely that ink will feed back into the dampening system.

The foamed-in-place, outer layer is preferably made of partially open-celled polyurethane foam which is very durable and can be easily cleaned as part of a normal press washing without any special procedures. In addition, the polyurethane foam is not subject to ink contamination in the normal printing environment. Thus, it eliminates the need for special cleaning and maintenance and the periodic need to replace and condition covers or sleeves.

The method of preparing the roller of the present invention comprises depositing the foam forming materials from a dispensing head in the form of a stream onto a metal, rubber, urethane or urethane foam covered cylindrical core that is being rotated at a speed which is adjusted based on roller size to minimize the material dripping from the surface. If needed, the core can be first ground to facilitate the retention of a thin layer of foam forming materials on the surface of the core. As the stream of foam making material is being deposited by the dispensing head onto the rotating core, the head is also traversing the length of the core being coated. The speed of the traverse movement is dictated by the size of the roller onto which the stream is being deposited. Once deposited, the stream of foam forming materials bonds to the core and slowly begin to rise and create a layer of foam. The foam layer can be varied in thickness and density by choice of material and/or substrate or material temperature. If required, a second foam layer can be applied to the first by allowing a period of time between coatings for the first layer to partially cure. Once the foam has cured to maturity the roller can be ground to the desired size.

The foregoing and other objects and advantages of the invention will be apparent to those skilled in the art from the description of the preferred embodiments.

BRIEF DESCRIPTION OF THE DRAWINGS

FIG. 1 is an elevational view, partly in section, of a roller of the present invention;

FIG. 2 is an enlarged sectional view taken along line 2—2 in FIG. 1;

FIG. 3 is a diagrammatic view showing the outer layer of the roller of FIG. 1 being formed; and FIG. 4 is a view taken along line 4—4 in FIG. 3.

DESCRIPTION OF THE PREFERRED EMBODIMENT

In the preferred embodiment of the invention as seen in FIGS. 1 and 2, the roller 10 consists of a rigid roller core 11, an intermediate support layer 12 and a foamed-in-place, cellular outer layer 13 of polyurethane foam containing about 30% to about 40% open cells and the remainder closed cells. As seen in FIG. 2 the cells 14 at the outer surface 15 can be different sizes than the cells 16 near the core 11 and connected to them.

The preferred core 11 is a conventional steel roller core. However, the core may be of other materials, such as fiberglass, provided they possess the required rigidity and other functional properties for use as the core of a printing roller.

As seen in FIGS. 3 and 4, in the preferred method of preparing the roller of the present invention, the polyurethane foam forming materials are deposited through the head 17 of mix metering equipment (not shown) at 75°–90° F. in the form of a stream at about 0.5 to about 1.0 pounds per minute onto the cylindrical metal core 11 that is being rotated at a speed which is adjusted based on roller size to minimize the material dripping from the surface. As the stream is deposited onto the rotating core by the head 17, the head 17 is also traversing the length of the roller or cylinder being coated, the speed of traverse again dictated by the size of the roller 10 onto which the stream is being deposited. Once deposited, the materials bind to the core 10 and begin to slowly rise and create a layer of polyurethane foam that cures at room temperature. The deposited foam layer can be varied in thickness and density by choice of the materials or temperatures. If required, a second foam layer can be applied to the first by allowing a partial curing time between coatings, usually 1–2 hours. The reservoir capacity of the roller can be further controlled by the wall thickness of the foam which is left on the core after the foam layer has cured and the roll is ground to achieve the diameter of the finished roller.

The grinding can be done once the foam has cured to maturity. Although curing at room temperature for about 24 to about 48 hours is usually adequate, a two hour 212° F. postcure can be used to accelerate the development of a full state of cure.

The choice of having a bare steel or a covered steel core 11 is determined by the necessary resistance required to keep the core material from corroding in the environment in which the roller is being used. The use of bonding agents or barrier coatings makes it possible to improve this aspect of the rollers construction.

In addition to the preferred open-celled polyurethane foam, any other type of foam material can be used which possesses the desired properties and durability under conditions of use.

The practice of the invention is further illustrated by the examples which follow.

EXAMPLE 1

Application of Foam Layer to Core

A core body of rigid steel about 50" in length and 2⅝" in diameter is cleaned of all grease, oil and foreign material. The cleaned core is then abraded using sand paper, a rotary sander, a belt sander or it is blasted with suitable grit to prepare the surface for application of the primer and bonding agent.

To the cleaned, sanded or blasted core is applied a primer coat which upon drying is then covered with a bonding agent of various types, most usually also urethane based. The primer materials are of the polyvinyl butyral type that is cured with a phosphoric acid catalyst, such as Conap AD-6, Chemlok 9944 Wash primer or the like. The cover cement is of a wide variety available, to be chosen from many such systems supplied from Lord Corporation or Dayton Products, Division of Whittaker Corporation, these possibly being Chemlok 210, Chemlok 213, Thixon 405 or the like. The preferred system is the Chemlok 9944 Wash Primer and Chemlok 213.

Once the application of the primer/cover combination has been completed, the roller is placed in a lathe and begun rotating at 3–50 rpm about the center line axis of the core. At that time, a two component urethane mixture which forms a cellular foam is processed through a mix metering machine and dispensed (0.5 to 1.0 pounds/minute) on the core which is rotated at a speed which minimizes the amount of material dripping from the core. The two component foam systems are available from Polyurethane Specialties Company, Lyndhurst, N.J., as their Milloxane 6000, 7000 or 7200 series of urethane foams, also other materials are available from Miles, Inc., Plastomeric US Inc., and others, or from in-house American Roller compounding. At the same time as the urethane mixture is being dispensed, the dispensing head travels traversely across the face length of the core being covered (10 to 30 inches/minute). As the urethane mixture adheres to the core, it gradually begins to blow and rise to a height that will eventually represent the foam layer of the roller. A second layer can be applied to the first to achieve greater foam layer thickness after a waiting period (e.g. 1 to 2 hours). The foam in question can be between about 5 to about 40 pcf (free blow density), with a 25% compressibility of about 5 to about 100 psi as measured by ASTM D575-91.

Once the foam has cured to maturity and cooled, it is ground to the required size. Although curing at room temperature for 24 to 48 hours is usually adequate, a 2 hour postcure at 212° F. can be used to accelerate the cure.

EXAMPLE 2

A fluid transfer roller having a steel core which is 50" long and 2⅝" in diameter prepared as described in Example 1 is provided with a polyurethane foam outer layer 0.050" thick, containing about 30% to about 40% open cells and having a compressibility of 10–100 psi (ASTM D575-91). The roller is used as a fluid transfer roll in an offset printing machine. After 90 to 120 days, the roller's performance was evaluated and found to be generally superior to the paper covered roller it replaced. In addition the roller showed no signs of wear or of a need to be replaced.

It will be apparent to those versed in the art that any number of foams could be developed and applied to the core to form the cellular foam layer. These foams could be either polyether or polyester in nature or of a specialty type, all providing cellular construction and the desired properties.

Those skilled in the art will recognize that a number of changes can be made without departing from the spirit and scope of the present invention. Therefore, it is intended that the invention only be limited by the claims that follow.

We claim:

1. A fluid transfer roller for use in an offset printing press; said improved dampening roller comprising:

(a) a rigid core; and, (b) an integral, foamed-in-place, cellular foam outer layer on said core, said foam having a compressibility of about 5 to about 100 psi as measured by ASTM D575-91 and containing about 10% to about 90% open cells at least some of which are interconnected.

2. A fluid transfer roller of claim 1 in which the foam is of polyurethane.

3. A fluid transfer roller for use in an offset printing press for picking up a film of water and transferring it to the plate cylinder, said improved roller comprising:

(a) a rigid core; and, (b) an outer layer of foamed-in-place, cellular foam, said foam having a free flow density of about 5 to about 70 pcf and a thickness of about 0.025" to about 0.250".

4. The fluid transfer roller of claim 3 in which the foam is of polyurethane.

5. The fluid transfer roller of claim 3 in which there is an intermediate layer of elastomeric material between the core and the outer layer.

6. The fluid transfer roller of claim 5 in which the intermediate layer is of polyurethane.

* * * * *